(12) United States Patent
Moore

(10) Patent No.: US 11,143,261 B2
(45) Date of Patent: Oct. 12, 2021

(54) SHOCK DAMPING SYSTEMS AND METHODS FOR USING SHOCK DAMPING SYSTEMS

(71) Applicant: HarvestMoore, L.L.C., Pasco, WA (US)

(72) Inventor: Francis Wilson Moore, Pasco, WA (US)

(73) Assignee: HarvestMoore, L.L.C., Pasco, WA (US)

( * ) Notice: Subject to any disclaimer, the term of this patent is extended or adjusted under 35 U.S.C. 154(b) by 7 days.

(21) Appl. No.: 15/976,797

(22) Filed: May 10, 2018

(65) Prior Publication Data

US 2018/0328437 A1 Nov. 15, 2018

Related U.S. Application Data

(60) Provisional application No. 62/504,384, filed on May 10, 2017.

(51) Int. Cl.
| | |
|---|---|
| *F16F 9/06* | (2006.01) |
| *F16F 9/34* | (2006.01) |
| *F16F 9/44* | (2006.01) |
| *B66F 9/075* | (2006.01) |

(52) U.S. Cl.
CPC .......... *F16F 9/065* (2013.01); *B66F 9/07586* (2013.01); *F16F 9/34* (2013.01); *F16F 9/44* (2013.01); *B66F 9/075* (2013.01); *F16F 2222/12* (2013.01); *F16F 2228/066* (2013.01); *F16F 2230/0023* (2013.01)

(58) Field of Classification Search
CPC ...... F16F 9/065; F16F 9/34; F16F 9/44; F16F 2222/12; F16F 2228/066; F16F 2230/0023; B66F 9/07586; B66F 9/075
See application file for complete search history.

(56) References Cited

U.S. PATENT DOCUMENTS

| | | |
|---|---|---|
| 2,288,682 A | 7/1942 | Chittenden |
| 2,443,027 A | 6/1948 | Dishmaker |
| 2,553,463 A | 5/1951 | McCulloch |
| 2,968,907 A | 1/1961 | Bernheim |
| 3,165,833 A | 1/1965 | Logan |
| 3,165,880 A | 1/1965 | Buie |
| 3,182,827 A | 5/1965 | Frost |

(Continued)

FOREIGN PATENT DOCUMENTS

| | | |
|---|---|---|
| EP | 0267860 A2 | 5/1988 |
| WO | WO PCT/US2010/046678 | 4/2011 |

OTHER PUBLICATIONS

Gorte, et al., "Structuring Laser-Scanned Trees Using 3D Mathematical Morphology", ResearchGate Conference Paper, Jan. 2004, 6 pgs.

(Continued)

*Primary Examiner* — Robert A. Siconolfi
*Assistant Examiner* — James K Hsiao
(74) *Attorney, Agent, or Firm* — Wells St. John P.S.

(57) ABSTRACT

This disclosure includes a shock damping system that has a pressure storage reservoir, a check valve in fluid communication with the pressure storage reservoir, and a needle valve in fluid communication with the pressure storage reservoir. The needle valve is in a parallel fluid-communication configuration with the check valve.

16 Claims, 8 Drawing Sheets

(56) References Cited

U.S. PATENT DOCUMENTS

| | | | |
|---|---|---|---|
| 3,277,572 A | 10/1966 | Eickenberg |
| 3,365,870 A | 1/1968 | Cardinale |
| 3,389,543 A | 6/1968 | Clark |
| 3,401,514 A | 9/1968 | Clark |
| 3,460,327 A | 4/1969 | Johnson et al. |
| 3,460,328 A | 8/1969 | Lee |
| 3,460,330 A | 8/1969 | Black |
| 3,507,107 A | 4/1970 | Harms |
| 3,561,205 A | 2/1971 | Baker |
| 3,564,826 A | 2/1971 | Middleton, Jr. |
| 3,591,949 A | 7/1971 | Connery |
| 3,596,456 A | 8/1971 | Quick |
| 3,621,643 A | 11/1971 | Garrans |
| 3,635,005 A | 1/1972 | Persson |
| 3,651,627 A | 3/1972 | Pitti |
| 3,690,053 A | 9/1972 | Thorn |
| 3,713,282 A | 1/1973 | Baker |
| 3,756,001 A | 9/1973 | Macidull |
| 3,793,814 A | 2/1974 | Rohrbach |
| 3,898,785 A | 8/1975 | Chew |
| 3,901,005 A | 8/1975 | Rohrbach |
| 3,913,307 A | 10/1975 | Cardinal, Jr. |
| 3,969,878 A | 7/1976 | Morganeier |
| 4,015,366 A | 4/1977 | Hall |
| 4,215,451 A | 8/1980 | Wikoff |
| 4,482,960 A | 11/1984 | Pryor |
| 4,501,113 A | 2/1985 | Gerber |
| 4,507,579 A | 3/1985 | Turner |
| 4,519,193 A | 5/1985 | Yoshida |
| 4,520,619 A | 6/1985 | Doi |
| 4,532,757 A | 8/1985 | Tutle |
| 4,606,179 A | 8/1986 | Peterson |
| 4,611,461 A | 9/1986 | Tyros |
| 4,663,925 A | 5/1987 | Terada |
| 4,718,223 A | 1/1988 | Suzuki |
| 4,769,700 A | 9/1988 | Pryor |
| 4,860,529 A | 8/1989 | Peterson |
| 4,880,160 A * | 11/1989 | Patterson ............ A01M 7/0053 |
| | | | 239/167 |
| 4,975,016 A | 12/1990 | Pellenc |
| 4,976,094 A | 12/1990 | Williamson |
| 5,005,347 A | 4/1991 | Kedem |
| 5,280,697 A | 1/1994 | Miller |
| 5,375,767 A * | 12/1994 | Thorstensson ...... A01M 7/0053 |
| | | | 239/164 |
| 5,426,927 A | 6/1995 | Wang |
| 5,471,827 A | 12/1995 | Janssen |
| 5,816,037 A | 10/1998 | Chiel |
| 5,946,896 A | 9/1999 | Daniels |
| 6,101,795 A | 8/2000 | Diekhans |
| 6,250,056 B1 | 6/2001 | Spagnolo |
| 6,272,819 B1 | 8/2001 | Wendte et al. |
| 6,425,233 B1 | 7/2002 | Hosking |
| 6,442,920 B1 | 9/2002 | Peterson |
| 6,553,299 B1 | 4/2003 | Keller |
| 6,591,591 B2 | 7/2003 | Coers |
| 6,671,582 B1 | 12/2003 | Hanley |
| 7,040,552 B2 * | 5/2006 | McCrea ............... A01C 23/047 |
| | | | 212/245 |
| 7,204,072 B2 | 4/2007 | Joy |
| 7,395,663 B2 * | 7/2008 | Thompson .......... A01M 7/0075 |
| | | | 60/403 |
| 7,418,985 B2 | 9/2008 | Torgersen |
| 7,487,809 B2 | 2/2009 | Uebergang |
| 7,500,343 B2 | 3/2009 | Hsia |
| 7,540,137 B2 | 6/2009 | Gray |
| 7,640,091 B2 | 12/2009 | Berg |
| 7,765,780 B2 | 8/2010 | Koselka |
| 7,810,305 B2 | 10/2010 | Macidull |
| 7,854,108 B2 | 12/2010 | Koselka et al. |
| 7,878,422 B2 * | 2/2011 | Heiniger ................ F15B 1/021 |
| | | | 239/159 |
| 8,381,501 B2 | 2/2013 | Koselka et al. |
| 8,442,304 B2 | 5/2013 | Marrion et al. |
| 8,938,941 B2 | 1/2015 | Minelli |
| 9,226,446 B2 | 1/2016 | Moore |
| 9,357,708 B2 | 6/2016 | Chang et al. |
| 9,439,354 B2 | 9/2016 | Minelli |
| 9,657,750 B1 * | 5/2017 | Theobald .................. F15B 1/02 |
| 2002/0056262 A1 | 5/2002 | Favache |
| 2002/0062635 A1 | 5/2002 | Hosking |
| 2005/0039431 A1 | 2/2005 | Schloesser |
| 2005/0126144 A1 | 6/2005 | Koselka |
| 2006/0026940 A1 | 2/2006 | Cartner |
| 2006/0150602 A1 | 7/2006 | Stimmann |
| 2006/0213167 A1 | 9/2006 | Koselka et al. |
| 2007/0012018 A1 | 1/2007 | Pellenc et al. |
| 2008/0010961 A1 | 1/2008 | Gray |
| 2008/0034720 A1 | 2/2008 | Helfrich et al. |
| 2008/0264030 A1 | 10/2008 | Bryan |
| 2008/0279460 A1 | 11/2008 | Kasahara |
| 2009/0293442 A1 | 12/2009 | Chang et al. |
| 2010/0037583 A1 | 2/2010 | Bryan, Jr. et al. |
| 2010/0050858 A1 * | 3/2010 | Heiniger ................ F15B 1/021 |
| | | | 91/468 |
| 2010/0212279 A1 | 8/2010 | Macidull |
| 2011/0022231 A1 | 1/2011 | Walker |
| 2014/0283495 A1 | 9/2014 | Christensen |
| 2016/0057940 A1 | 3/2016 | Lyons |
| 2016/0221448 A1 * | 8/2016 | Pritchard .................. B60L 7/24 |
| 2018/0162705 A1 * | 6/2018 | Kubotani ............. B60G 17/005 |

OTHER PUBLICATIONS

Engineering Notes, "Flow through Pipes in Series and Parallel: Difference Diameters, Equations and Solved Problems", available at https://www.engineeringnotes.com/fluids/pipes/flow-through-pipes-in-series-and-parallel-difference-diameters-equations-and-solved-problems/47568, Aug. 2017, 7 pgs.

Wikipedia, "Series and Parallel Circuits", available online at https://en.wikipedia.org/wiki/Series_and_parallel_circuits, Apr. 25, 2017, 9 pages.

* cited by examiner

Hose to Top
connection of
Hydraulic Lift
Cylinder/Cylinders

Hose to Bottom
connection of
Hydraulic Lift
Cylinder/Cylinders

SHOCK DAMPING SYSTEMS AND METHODS FOR USING SHOCK DAMPING SYSTEMS

CROSS REFERENCE TO RELATED APPLICATION

This application claims benefit of U.S. Provisional Patent Application No. 62/504,384 filed on May 10, 2017.

TECHNICAL FIELD

Shock damping systems and methods for using shock damping systems.

BACKGROUND

Loads and packages that are sensitive to shock or impact forces (loads) are often handled and transported by suspension systems. Exemplary suspensions include fork lift apparatuses which have no shock damping systems apart from large rubber tires. However, large rubber tires do not provide sufficient protection from shock or impact forces that are often encountered on rough ground or pavement such as impacting curbs and/or dropping into holes.

Loads easily damaged by shock forces include bins of fruit such as apples, cherries, peaches and apricots. Other types of loads that are fragile, and therefore need protection from shock forces include electronics, glass items and precision instruments. In addition to large rubber tires, exemplary solutions to shock forces includes packaging designs for the products and produce. However, this solution has been ineffective due to the many different design considerations necessary to meet the different requirements and needs of the respective products and produce. Configuring different packaging designs compensating for the different products and produce results in solutions being difficult, time consuming and expensive.

There is a need to find a solution for reducing shock forces to sensitive and fragile produce and products to maintain their viability for the market.

BRIEF DESCRIPTION OF THE DRAWINGS

Embodiments of the disclosure are described below with reference to the following accompanying drawings.

DETAILED DESCRIPTION OF THE EMBODIMENTS

This disclosure is submitted in furtherance of the constitutional purposes of the U.S. Patent Laws "to promote the progress of science and useful arts" (Article 1, Section 8).

This invention consists of a shock damping system to reduce the shock forces and impact forces to a load being carried, for example, on the forks of a forklift. Exemplary forks are routinely secured or attached to a 3-point hitch on tractors, and alternatively, forks are attached in place of a bucket on front loaders on tractors or front loader machines.

To reduce or dampen, or even negate, a shock force and a impact force, the invention takes advantage of the following impact force equation:

"impulse=integral time $t_1$ to $t_2$ Force $F$ $dt$=integral Velocity $v_1$ to $v_2$ Mass $m$ $dv$"

"Integral $v_1$ to $v_2$ $m$ $dv$=$mv_2$-$mv_1$"

The special case where force is a constant in magnitude and direction results in:

$Ft=mv_2-mv_1$

Therefore: increasing the time decreases the force.

This is accomplished by allowing the load on the forks to move and using the momentum of the load to move the piston in the cylinder to flow fluid to the accumulator and store the energy as increased nitrogen gas pressure. Once the impact force has terminated the force in the accumulator will be higher than in the cylinder. The check valve will close preventing the fluid to flow back into the cylinder because a spring-loaded ball will close on the valve seat. The fluid must then flow back to the cylinder through the needle valve with a smaller orifice until the pressure is equalized in the system. The time that the energy is released will have increased a good deal and since energy is conserved the impact force received by the load is decreased by the following: F×$t_1$ (no damping)=F (load)×$t_2$ (with damping).

Damping can be accomplished in any vector direction by using a dual action cylinder oriented in the direction of the vector of the impact force. The fluid on each side of the cylinder piston is connected to separate damping system. Each damping system will increase the impact force action time and reduce the resultant impact force on the load along the direction of the cylinder.

The static pressure on the side of the piston that is supporting the static load is balanced by the pressure in the accumulator connected to the load carrying side of the piston. The pressure can be adjusted so the piston does not bottom out and maintains the piston positioned away from the ends of the cylinder by adjusting the pressure in the accumulator gas bladder.

Figure 8:
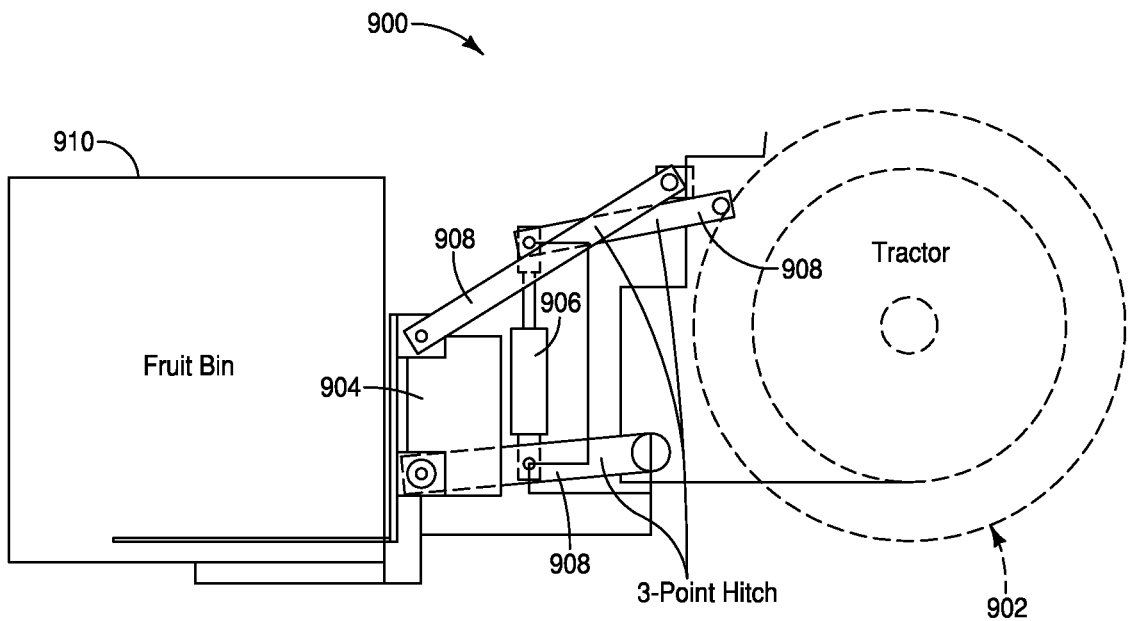
FIG. 8 is a perspective view of an exemplary method of use for an exemplary shock damping system according to an embodiment of the invention.
Figure 9:
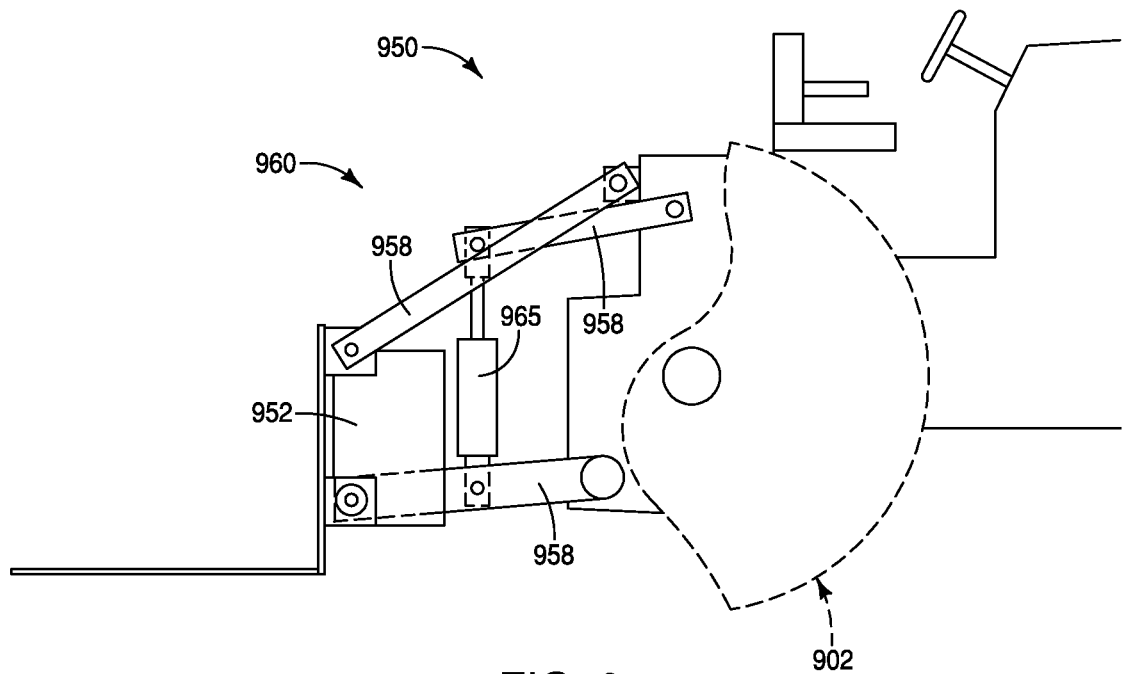
FIG. 9 is a perspective view of an exemplary method of use for an exemplary shock damping system according to another embodiment of the invention.

The shock damping systems in FIGS. 8 and 9 are shown installed on a 3-point hitch for a tractor which in one embodiment is being used for hauling full bins of fruit out of the orchard. The ground is often rough and the loading area gets rutted by semi-trucks hauling fruit from the orchard. The shock damping system protects the fruit from receiving impact loads high enough to cause cruse bruising of the fresh fruit.

The invention also relates to methods and apparatus for that provide shock absorbing function for heavy loads on the forks of forklifts, 3-point hitch of tractors, front loaders of tractors, on front loader equipment. In the case of forklifts, the apparatus utilizes the main lift cylinder of the forklift. In the case of tractors with front loaders and front loader machines, the two main lift cylinders for raising the bucket or forks are utilized. Two cylinders replace the lift arms that raise and lower the 3-point hitch system on the rear of a tractor. The cylinders are connected to two separate Shock Damping Systems if each cylinder can have unbalanced loads. In the case where there are two cylinders but the loads are equally divided by design only on Shock Damping System may be required.

Throughout this document, when a fluid is referred to, any fluid is possible, and any fluid source is possible. For ease of discussion, in one embodiment, the fluid is hydraulic fluid and the fluid source is a hydraulic cylinder with a piston.

Moreover, throughout this document, when a gas is referred to, any gas is possible, and any gas source is possible. For ease of discussion, in one embodiment, the gas is nitrogen.

Figure 1:
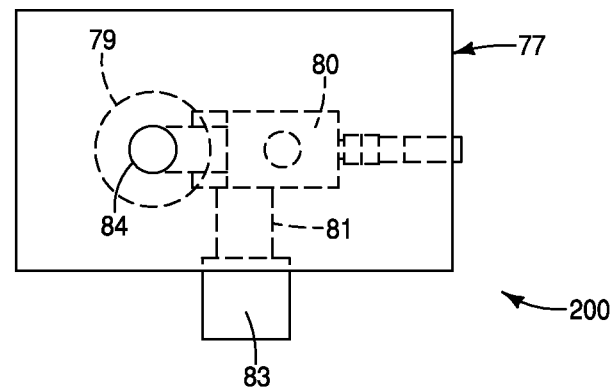
FIG. 1 is a top view and a front view of an exemplary shock damping system according to an embodiment of the invention.
Figure 1:
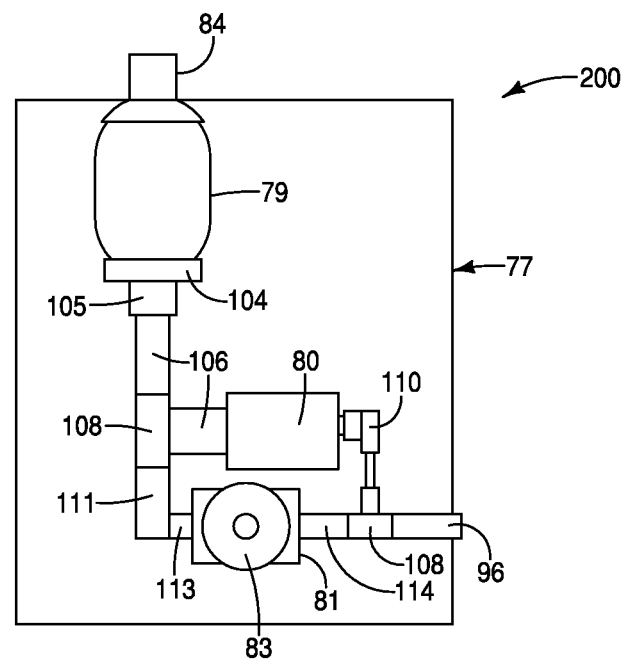

Referring to FIG. 1, an exemplary shock damping system 200 is disclosed. Shock damping system 200 includes a housing 77 to house an accumulator 79, check valve 80 and a needle valve 81. In one embodiment, the accumulator 79 is a bladder accumulator, and more specifically, a hydraulic bladder accumulator. A first end 84 of the accumulator 79 is a gas valve 84 (charge valve) configured to receive a gas to fill the bladder (not shown) in the accumulator 79. An exemplary non-limiting gas is nitrogen. A second end is a combination of a bracket 104 and FJS fitting 105 (FJS=female JIC (Joint Industrial Council) straight).

The following is a discussion of the exemplary conduits that connect accumulator 79, check valve 80 and a needle valve 81 in fluid communication and are hydraulic pressure fittings. Moreover, in all the shock damping systems disclosed in this document may use the same exemplary conduits for and therefore may not be described in the subsequent different shock damping systems nor even reference with numbers.

Still referring to FIG. 1, a ⅜ Female JIC Swivel 106 extends from the combination of bracket 104 and FJS fitting 105 of the accumulator 79. A ⅜ Male JIC tee 108 (first tee) extends from the swivel 106. Another swivel 106 extends from the first tee 108 into a first end of the check valve 80 (additional information about the check valve is discussed throughout this document). A second end of the check valve 80 is connected to a JIC elbow 110 which is connected to a second tee 108. A first end of the second tee 108 is connected to a hose 96 that exists the housing 77 of shock damping system 200. Hose 96 is ultimately connected to a fluid source, for example, a hydraulic fluid source from a hydraulic cylinder. An opposite end of the second tee 108 is connected to another FJS fitting 114 which connects to a first end of the needle valve 81 (additional information about the needle valve is discussed throughout this document). Needle valve 81 includes an adjustment knob 83. An opposite second end of the needle valve 81 is connected to a ⅜ JIC male union 113 which is connected to a ⅜ MJxMAROB (Male O-Ring Boss) Fitting 90° 111 which is connected to the second tee 108 previously discussed.

Still referring to FIG. 1, the shock damping system 200 has the needle valve 81 in a parallel fluid-communication configuration with the check valve 80. That is, respective first ends of the needle valve 81 and the check valve 80 are coupled to the same first conduit in fluid communication and respective second ends of the needle valve 81 and the check valve 80 are coupled to the same second conduit in fluid communication. The check valve 80 is oriented to allow rapid fluid flow from the fluid source (hydraulic cylinder) to the accumulator 79. The fluid flow restriction is low so that the fluid can flow quickly from the hydraulic cylinder to the accumulator 79 to store the energy in the accumulator 79 and keep the shock force on the cylinder rod (in the hydraulic cylinder) low thereby protecting the load from the initial shock force. Once the accumulator pressure and the cylinder pressure are equalized and the impact force is no longer on the cylinder rod, the fluid in the accumulator 79 will be at a higher pressure and will want to rush back (flow back quickly) into the hydraulic cylinder. This will create a rebound force which can also be high and impact the load/product. The check valve 80 closes and prevents the high fluid flow rate back into the cylinder. The needle valve 81 will let the pressure in the accumulator 79 slowly equalize with the pressure in the cylinder. The increased time for the fluid to flow back into the cylinder will result in a greatly reduced impact force.

Still referring to FIG. 1, the needle valve 81 is adjustable via adjustable knob 83 to allow for various conditions of the terrain that an exemplary forklift or tractor with the hydraulic cylinder is traversing. The needle valve 81 is adjusted to optimize the time to equalize the accumulator 79 and cylinder pressure and allowing the cylinder to return to its normal static position before the next bump or hole is encountered.

Still referring to FIG. 1, and as stated previously, an exemplary accumulator 79 is a bladder accumulator which allows for the sizing of the accumulator 79 to compensate for the variation in shock forces. That is, a large surface area between the hydraulic fluid and the nitrogen provides a faster response time to increasing fluid pressure. The increased pressure in the accumulator 79 must allow the cylinder rod (in the hydraulic cylinder) to move until the pressure in the cylinder and the accumulator 79 are equalized or the impact force is no longer on the cylinder. A long pressure increase rate vs time is desired for the duration of the impact force. Since the most likely impact is dropping off a 6-inch curb, the acceleration due to gravity and hitting rigid concrete is one of the higher impact forces that a load/product is likely to receive or encounter.

Still referring to FIG. 1, an exemplary method of use for shock damping system 200 is described. Shock damping system is compatible for use with a single action lift cylinder forklift. Accordingly, hydraulic hose 96 is connected to a hydraulic cylinder of the forklift establishing fluid communication. The bladder in accumulator 79 is filled with a gas, such as nitrogen, by securing a nitrogen source to the gas valve 84. Once the bladder is filled to a desired volume and pressure, the nitrogen source is removed.

Still referring to FIG. 1, when the forklift experiences an impact force (shock force) such as the front loader traversing a bump or dropping into a hole, a dynamic force is created and actuates the cylinder piston (in the hydraulic cylinder). The piston is pushed or pulled and moves in the corresponding direction depending on the direction of the force (up or down). The movement of the piston forces hydraulic fluid to flow from the hydraulic cylinder into the shock damping system 200. The hydraulic fluid enters the shock damping system 200 through hose 96 into the second tee 108. The second tee 108 allows the hydraulic fluid to flow through the needle valve 81 and through the check valve 80. The orifice in the check valve 80 is dimensioned to allow the free flow of the hydraulic fluid while the orifice in the needle valve 81 is dimensioned to allow a diminished flow of the hydraulic fluid. The hydraulic fluid flows through the needle valve 81 and through the check valve 80 into the accumulator 79 and opposite a side of the bladder from the gas.

Still referring to FIG. 1, kinetic energy from the hydraulic fluid is stored in the gas in the accumulator 79 by compressing the bladder, and therefore the gas, to a higher pressure. When the shock force ends, the orifice of the check valve 80 closes and prevents back flow of the hydraulic fluid from accumulator 79 through the check valve 80. However, the needle valve 81 installed in the parallel fluid-communication configuration with the check valve 80 allows the hydraulic fluid to back flow from accumulator 79 through the needle valve 81. The needle valve 81 allows the hydraulic fluid to flow back into the hydraulic cylinder until the pressure is equalized in the hydraulic cylinder and the accumulator 79. The rate of time required for the volume of fluid to flow back into the hydraulic cylinder to equalize the pressure is increased as the size of the orifice in the needle valve 81 is reduced. The increase in rate of time for the back flow of the hydraulic fluid is directly proportional to the decreased in the force that impacts the payload on the fork receives during the back flow. Accordingly, the impact force on the payload is dampened to an acceptable magnitude.

Figure 2:
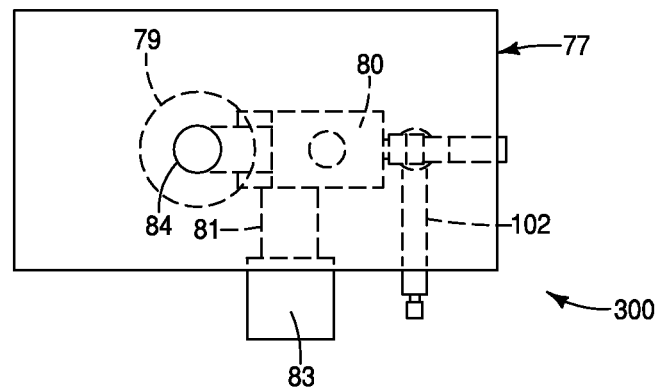
FIG. 2 is a top view and a front view of an exemplary shock damping system according to another embodiment of the invention.
Figure 2:
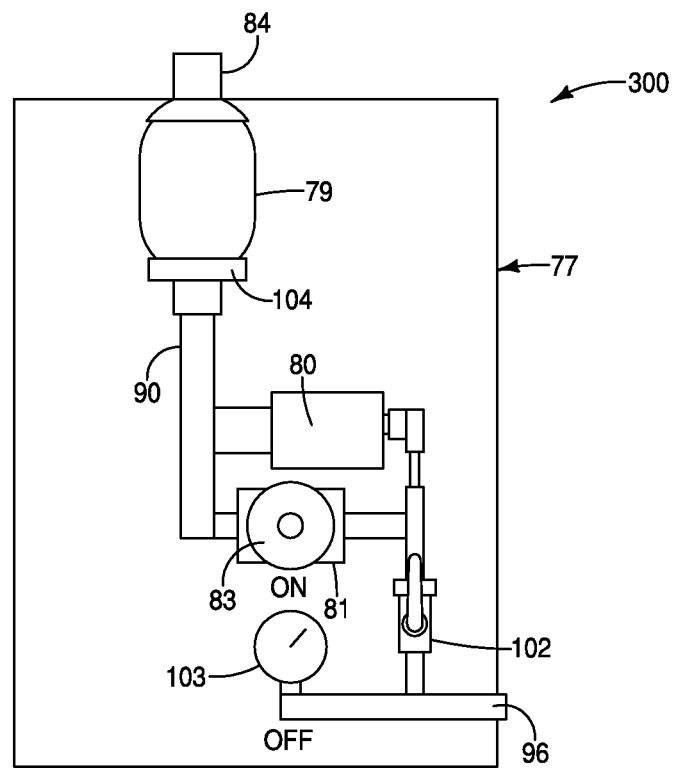

Referring to FIG. 2, another exemplary shock damping system 300 is disclosed, and in one embodiment, operates as the shock damping system 200 of FIG. 1. Reference numbers presented in FIG. 2 that are the same reference numbers as presented in FIG. 1 indicate the same item/structure/device and may, or may not, be described again. The swivel 106, tee 108 (first tee) and MAROB Fitting 111 of FIG. 1 are represented as reference number 90 in FIG. 2 for simplicity. Shock damping system 300 is compatible for use with a single action lift cylinder forklift and includes an optional pressure gauge 103 and an isolation valve 102 for situations when shock load protection is not needed or desired.

Still referring to FIG. 2, the pressure in the gas side of the accumulators 79 can be read on the pressure gauges 103. The gas pressure can be increased or decreased through the nitrogen fill valve 84 as desired. This capability is utilized to locate the piston midway in the hydraulic cylinder when under the influence of a load.

Still referring to FIG. 2, the isolation valves accommodate a dual shut off valve for dual lift hydraulic cylinders which allows the shock damping system 300 to be isolated from the cylinders on the forklifts, tractor front loaders, and/or front loader machines when the shock damping system 300 is not needed or desired.

Figure 3:
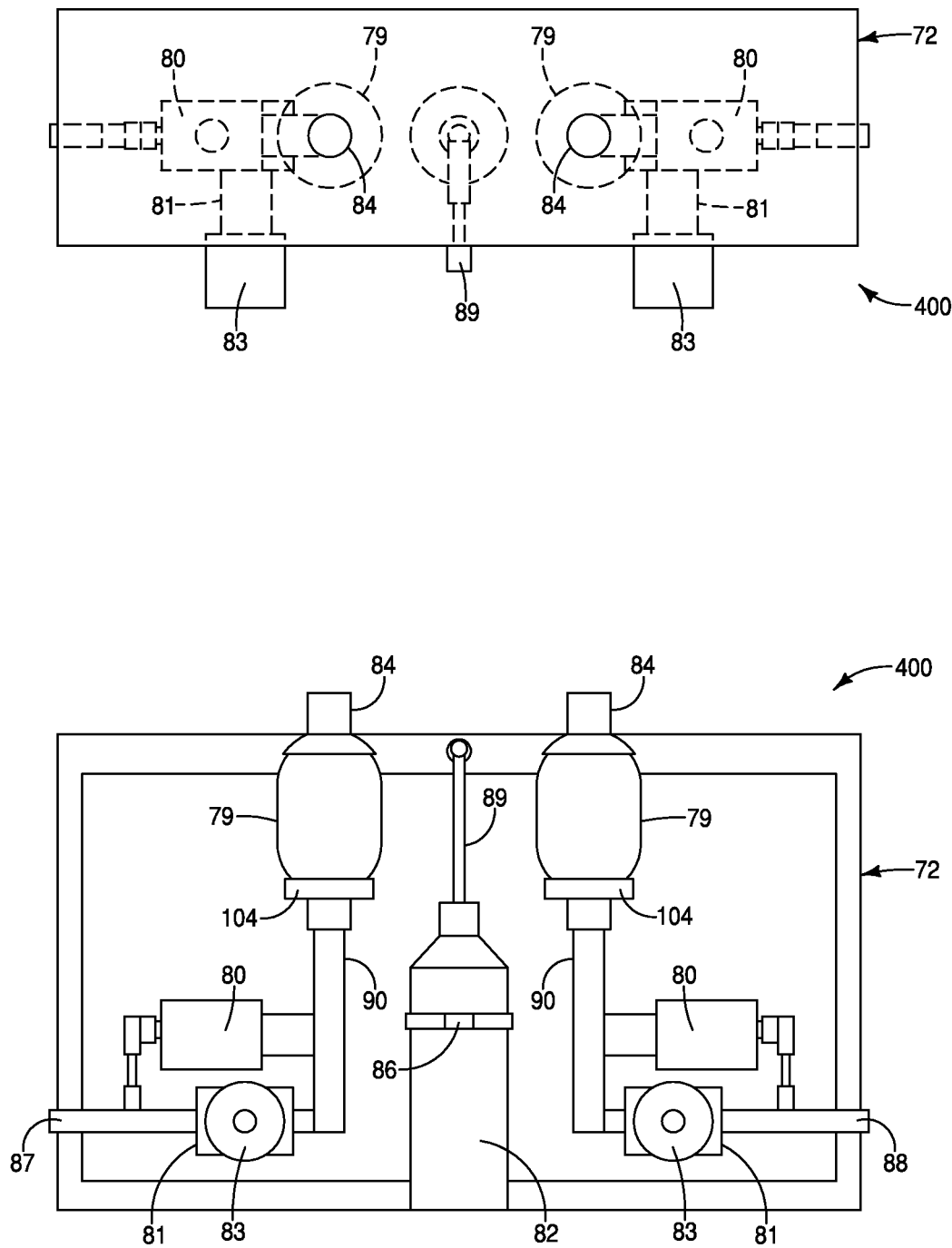
FIG. 3 is a top view and a front view of an exemplary shock damping system according to another embodiment of the invention.

Referring to FIG. 3, another exemplary shock damping system 400 is disclosed. For this system, two shock damping systems 400 are housed in a house 72. In one embodiment, each shock damping system 400 operates as the shock damping system 200 of FIG. 1. Reference numbers presented in FIG. 3 that are the same reference numbers as presented in FIG. 1 indicate the same item/structure/device and may, or may not, be described again. Shock damping system 400 is compatible for use with a 3-point hitch, such as one secured to a tractor wherein there are two hydraulic cylinders. Each hydraulic cylinder is dedicated to one of the two shock damping systems 400.

Still referring to FIG. 3, a canister 82 is disclosed and secured in housing 72 between the two shock damping systems 400. In one embodiment, cannister 82 is a 1-quart container similar to the canister that brake fluid is routinely stored. Canister 82 receives the fluid from the other side of the piston on a dual action hydraulic cylinder. A dual action hydraulic is a hydraulic cylinder that has hydraulic fluid on both sides of the hydraulic piston. The piston can pull, as well as push, fluid and correspondingly extend or retract the cylinder rod. Since the payload is a pull load on a pack fork for the 3-point hitch, a dual action cylinder is required. Accordingly, canister 82 as a place for the hydraulic fluid to go when the rod is at the bottom of the hydraulic cylinder. As the piston rod is extended in the hydraulic cylinder, the fluid is pulled from canister 82 back into the lower volume of the hydraulic cylinder. This provides lubrication for both sides of the piston seals.

It should be understood that in the case of forklift where the hydraulic cylinder is a single action cylinder, this configuration can only push the cylinder rod up. Consequently, when the fluid is released from the cylinder, the weight of the forks (of the forklift) push the cylinder rod down and the fluid out of the cylinder.

It should be further understood that front loaders use two dual action cylinders so down pressure as well as up pressure can be applied to a bucket for a digging function. In this case, two shock damping systems are required, one for the top, and one for the bottom, of the two cylinders. On front loaders, the two cylinders are connected in parallel that raise and lower the bucket.

Figure 4:
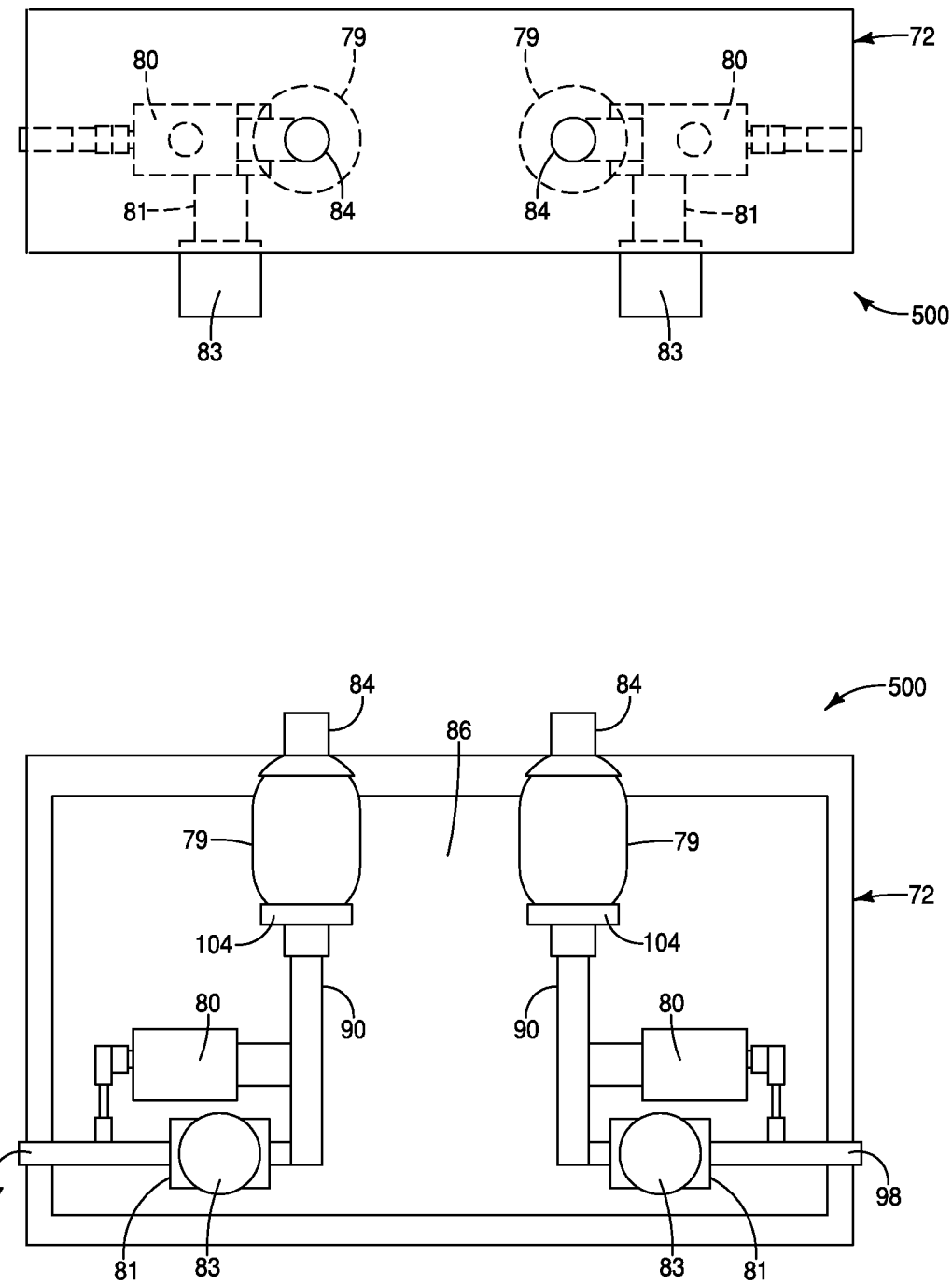
FIG. 4 is a top view and a front view of an exemplary shock damping system according to another embodiment of the invention.

Referring to FIG. 4, another exemplary shock damping system 500 is disclosed and house 72 protects two shock damping systems 500. Reference numbers presented in FIG. 4 that are the same reference numbers as presented in FIG. 1 indicate the same item/structure/device and may, or may not, be described again. The shock damping system 500 is compatible for use with single action lift cylinders, for example, on a front loader. Shock damping system 500 is similar to the shock damping system 400 of FIG. 3 except the housing 72 of the shock damping system 500 does not include canister 82 of the shock damping system 400.

Figure 5:
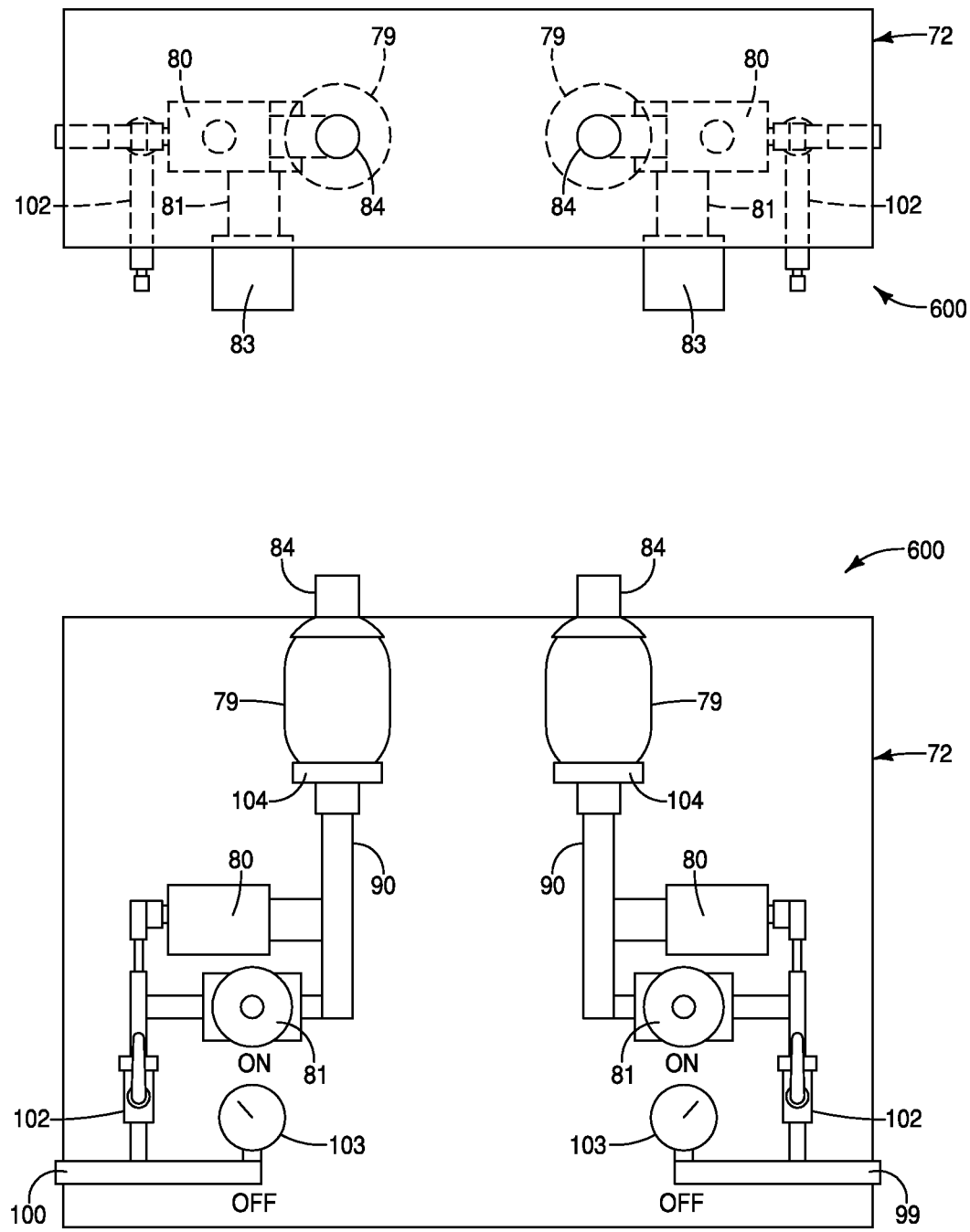
FIG. 5 is a top view and a front view of an exemplary shock damping system according to another embodiment of the invention.

Referring to FIG. 5, another exemplary shock damping system 600 is disclosed and house 72 protects two shock damping systems 600. Reference numbers presented in FIG. 5 that are the same reference numbers as presented in FIG. 1 indicate the same item/structure/device and may, or may not, be described again. Shock damping system 600 is compatible for use with dual action lift cylinders, such as configured on a front loader. Each of the two shock damping systems 600 are configured as the shock damping systems 300 disclosed in FIG. 2. Accordingly, each of the two shock damping systems 600 include a pressure gauge 103 and an isolation valve 102 for situations when shock load protection is not needed or desired.

Still referring to FIG. 5, the pressure in the gas side of the accumulators 79 can be read on the pressure gauges 103. The pressure can be increased or decreased through the nitrogen fill valve 84 as desired. This is utilized to locate the piston midway in the hydraulic cylinder when under the influence of a load.

Still referring to FIG. 5, the isolation valves accommodate a dual shut off valve for dual lift hydraulic cylinders which allows the shock damping systems 600 to be isolated from the cylinders on the forklifts, tractor front loaders, and/or front loader machines when the shock damping systems 600 are not needed or desired.

Figure 6:
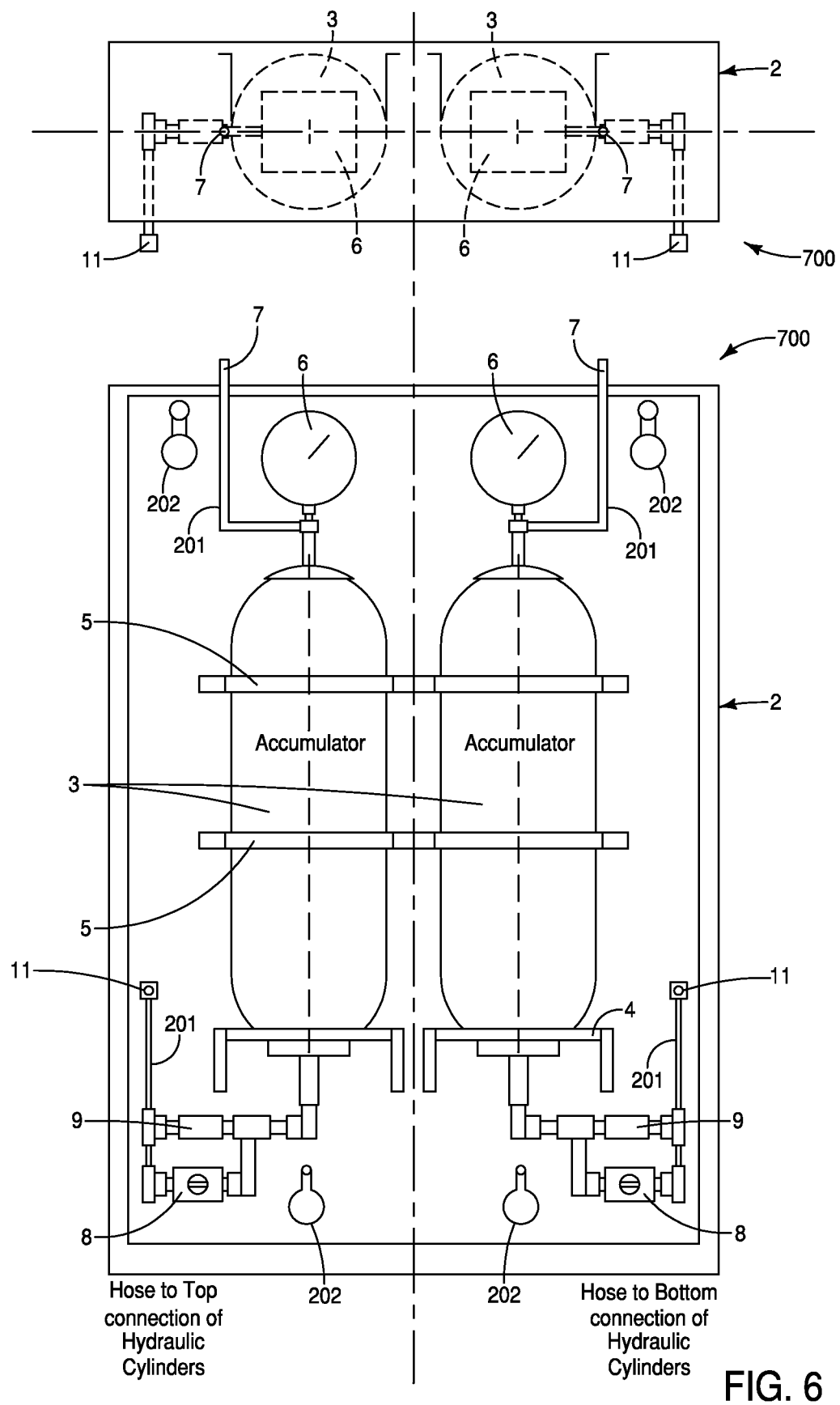
FIG. 6 is a top view and a front view of an exemplary shock damping system according to another embodiment of the invention.

Referring to FIG. 6, another exemplary shock damping system 700 is disclosed. Reference numbers presented in FIG. 6 that are the same reference numbers as presented in FIG. 1 indicate the same item/structure/device and may, or may not, be described again. Shock damping system 700 includes two shock damping systems 700, and therefore, includes two accumulators 3 attached to a housing 2 via support brackets 4 and support straps 5. Each of the two shock damping systems 700 includes a needle valve 8 in a parallel fluid-communication configuration with a check valve 9. The collection of hydraulic fluid pressure fittings that provides fluid communication between the needle valve 8, the check valve 9 and accumulator 3 culminate in a stainless-steel tubing 201. Steel tubing 201 terminates with a connector 11 configured to be secured to a fluid source such as hydraulic fluid from a hydraulic cylinder.

Still referring to FIG. 6, the two shock damping systems 700 include pressure gauges 6 that indicate the pressures of the gas in the gas side of the accumulators 3. Still further, housing 2 includes strategically positioned cut outs 202 configured to receive mounting bolts (not shown). A stainless-steel tubing 201 extends from a gauge stem of the pressure gauges 6 and terminates with a valve stem 7 configured to be secured to a gas source, for example, nitrogen. The valve stem 7 configuration allows for the bladder in the accumulators 3 to be filled with gas. Moreover, the gas pressure can be increased or decreased through the valve stems 7 which is utilized to position a hydraulic piston midway in the hydraulic cylinder 12 when under load.

Figure 7:
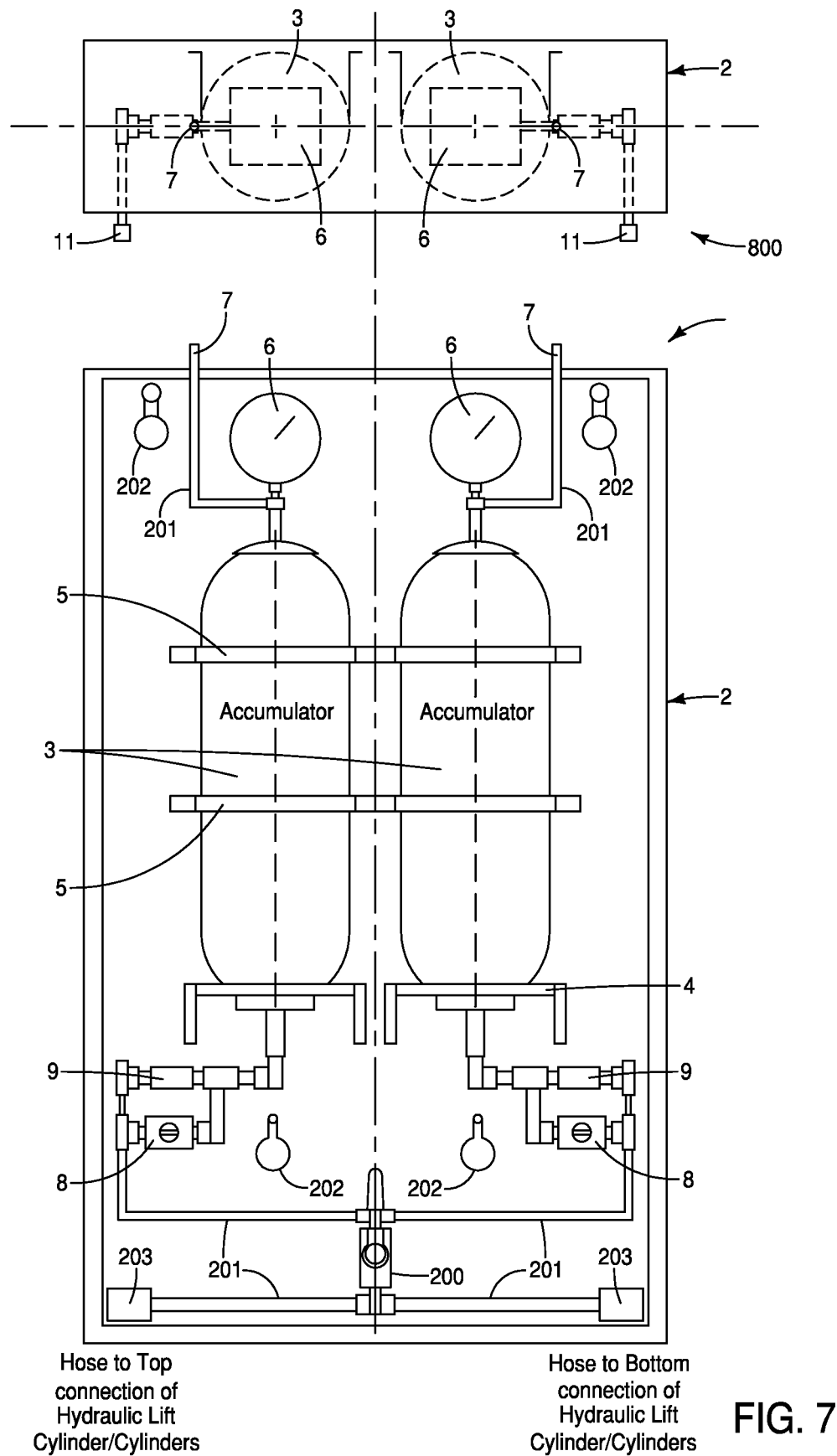
FIG. 7 is a top view and a front view of an exemplary shock damping system according to another embodiment of the invention.

Referring to FIG. 7, another exemplary shock damping system 800 is disclosed. Reference numbers presented in FIG. 7 that are the same reference numbers as presented in FIG. 1 indicate the same item/structure/device and may, or may not, be described again. Shock damping system 800 includes two shock damping systems 800, and therefore, includes two accumulators 3 attached to a housing 2 via support brackets 4 and support straps 5. Each of the two shock damping systems 800 includes a needle valve 8 in a parallel fluid-communication configuration with a check valve 9. The collection of hydraulic fluid pressure fittings that provides fluid communication between the needle valve 8, the check valve 9 and accumulator 3 culminate in a first pair of stainless-steel tubings 201 extending from respective ends of each needle valve 8 and each check valve 9. The first pair of stainless-steel tubings 201 terminate being connected into an isolation valve 200. The isolation valve 200 includes dual ports configured to receive a second pair of stainless-steel tubings 201. Each one of the second pair of stainless-steel tubings 201 terminate with a connector 203 configured to be secured to a fluid source such as hydraulic fluid from a hydraulic cylinder.

Still referring to FIG. 7, the two shock damping systems 800 include pressure gauges 6 that indicate the pressures of the gas in the gas side of the accumulators 3. Still further, housing 2 includes strategically positioned cut outs 202 configured to receive mounting bolts (not shown). A stainless-steel tubing 201 extends from a gauge stem of the pressure gauges 6 and terminates with a valve stem 7 configured to be secured to a gas source, for example, nitrogen. The valve stem 7 configuration allows for the bladder in the accumulators 3 to be filled with gas. Moreover, the gas pressure can be increased or decreased through the valve stems 7 which is utilized to position a hydraulic piston midway in the hydraulic cylinder 12 when under load.

Still referring to FIG. 7, the shock damping system 800 is compatible for use with forklifts, tractor front loaders, and front loader machines. It should be understood that isolation valve 200 allows for the shock damping system 800 to be isolated from the hydraulic cylinders on the forklifts, tractor front loaders, and front loader machines when the shock damping system 800 is not needed.

Referring to FIG. 8, an exemplary method of use 900 for any one of the shock damping systems disclosed in this application is described. In one embodiment, an exemplary shock damping system 904 (only housing is illustrated) is shown installed on a 3-point hitch 908 for a tractor 902 (only one wheel and hitch shown). In one embodiment, tractor 902 is being used for hauling fruit in bins 910 from an orchard. The ground is often rough and the loading area gets rutted from the semi-trucks hauling the fruit from the orchard. The shock damping system 900 and the hydraulic cylinders 906 protect the bin full of fruit from receiving impact forces high enough to cause bruising of the fruit. This is accomplished by increasing the time that the shock impact acts on the bin 910 of fruit.

Still referring to FIG. 8, when the tractor 902 hits a bump, or drops into a hole, then a dynamic force is applied either on the top or bottom of the cylinder piston (inside hydraulic cylinders 906) depending on the direction of the force (up or down). In response to movement of the piston, hydraulic fluid (inside hydraulic cylinders 906) is pushed out of the hydraulic cylinders 906 and into the shock damping system 904 and ultimately into a dedicated accumulator (inside shock damping system 904; see FIGS. 1-7). The kinetic energy from the moving fluid is stored in the gas in the accumulator by compressing the gas in the accumulator to a higher pressure.

Still referring to FIG. 8, when the shock force has expired, the check valve (see FIGS. 1-7) closes and prevents the hydraulic fluid from flowing back into the hydraulic cylinders 906. A needle valve (see FIGS. 1-7) is installed parallel to the check valve (inside shock damping system 904; see FIGS. 1-7), and in that configuration, the hydraulic fluid flows back into the cylinders 906 through needle valve (see FIGS. 1-7) until the pressure is equalized in the hydraulic cylinders 906. However, the orifice in the needle valve is dimensioned to create a slow return flow of the hydraulic fluid back into the hydraulic cylinders 906. The time for the volume of fluid required to flow back into the hydraulic cylinders 906 to equalize the pressure can even be adjusted by adjusting the size of the orifice in the needle valve. The orifice can be increased or decreased as needed. The increase in the rate of time for the flow back and equalization is directly proportional to the decrease in force that the payload on the fork receives.

Referring to FIG. 9, another exemplary method of use 950 for any one of the shock damping systems disclosed in this application is described. In one embodiment, an exemplary shock damping system 952 (only housing is illustrated) is shown installed on a 3-point hitch 958 for a tractor 960 (only partially shown). In one embodiment, tractor 960 is being used for hauling unbalanced loads of fruit in bins (not shown) from an orchard. The ground is often rough and the loading area gets rutted from the semi-trucks hauling the fruit from the orchard. Operation of the shock damping system 952 in combination with the hydraulic cylinders 965 dampen the magnitude of impact forces (shock forces) thereby protecting the bin full of fruit from bruising. This is accomplished by increasing the time that the shock impact acts on the bin of fruit.

Still referring to FIG. 9, when the tractor 960 hits a bump, or drops into a hole, then a dynamic force is applied either on the top or bottom of the cylinder piston (inside hydraulic cylinders 965) depending on the direction of the force (up or down). In response to movement of the piston, hydraulic fluid (inside hydraulic cylinders 965) is pushed out of the hydraulic cylinders 965 and into the shock damping system 952 and ultimately into a dedicated accumulator (inside shock damping system 952; see FIGS. 1-7). The kinetic energy from the moving fluid is stored in the gas in the accumulator by compressing the gas in the accumulator to a higher pressure.

Still referring to FIG. 9, when the shock force has expired, the check valve (see FIGS. 1-7) closes and prevents the hydraulic fluid from flowing back into the hydraulic cylinders 965. A needle valve (see FIGS. 1-7) is installed parallel to the check valve (inside shock damping system 952; see FIGS. 1-7), and in that configuration, the hydraulic fluid flows back into the cylinders 965 through needle valve (see FIGS. 1-7) until the pressure is equalized in the hydraulic cylinders 965. However, in the case of the non-pressurized accumulator (vented), the orifice in the needle valve (see FIGS. 1-7) is dimensioned to control the duration of time for the return flow of the hydraulic fluid back into the hydraulic cylinders 965 and allow the pressure to equalize between the accumulator and the cylinder 965. The time for the volume of fluid to equalize the accumulator and the cylinder 965 even be adjusted by adjusting the size of the orifice in the needle valve (see FIGS. 1-7). The orifice can be increased or decreased as needed. The increase in the rate of time for the flow back and equalization is directly proportional to the decrease in force that the payload on the fork receives.

It should be further understood, and in exemplary non-limiting cases or situations, that for all the embodiments of the shock damping systems disclosed throughout this application, consideration may, or may not, be given to sizing of the orifice in the check valves. Check valves will have an orifice that allows the fluid to leave the fluid source (hydraulic cylinders) as quickly as 50 gallons per minute (gpm). This is fast enough that the pressure does not increase fast enough to create a shock force more than one order of magnitude. Once the dynamic (shock force) is dissipated or terminated, the check valve closes and prevents the flow of hydraulic fluid back into the cylinder due to the higher pressure stored in the accumulator. The needle valve has a small orifice compared to the check valve orifice when open. The time for the stored pressure in the accumulator is equalized increases a great deal for the pressure in the accumulator and the cylinder to equalize, therefore reducing the rebound shock load by orders of magnitude. The orifice is dimensioned to allow the percentage of the flow volume from the hydraulic cylinder to reach a flow rate to pressurize the accumulator to the pressure needed to store the energy to reduce the impact force to an acceptable level, for example, 7 Gs (G=gravitational constant).

It should be further understood, and in exemplary non-limiting cases or situations, that for all the embodiments of the shock damping systems disclosed throughout this application, the needle valves may, or may not, have adjustable orifices. In embodiments with needle valves having adjustable orifices, adjustability allows the size of the orifice to be varied to allow the time for the rebound flow to be optimized. In one embodiment, the orifice of the needle valve is set on the order of 25 percent of the cross area of the orifice of the check valve to keep the rebound impact below 7 Gs.

It should be further understood, and in exemplary non-limiting cases or situations, that for all the embodiments of the shock damping systems disclosed throughout this application, the sizing of the accumulator may, or may not, be a consideration. In one embodiment, the accumulator is a bladder accumulator. To accommodate a large weight of produce or product, a large surface area in the accumulator between the fluid and the nitrogen provides a faster response time to increasing fluid pressure. The increased pressure in the accumulator must allow the cylinder rod (in the hydraulic cylinder) to move until the pressure in the cylinder and the accumulator are equalized or the impact force is no longer on the cylinder. A long pressure increase rate vs time is desired for the duration that the impact force is encountered. Since the most likely impact is a 6-inch curb, the acceleration due to gravity and hitting rigid concrete is one of the higher impact forces that the product is likely to receive.

It should be further understood, and in exemplary non-limiting cases or situations, that a 1,000-pound load is on a forklift with a 3-inch piston lift cylinder is considered. The area of the piston is Pi time the radius Squared which is 3.14×1.5 inch squared. This equals 28.26 SQ inches. The Hydraulic static pressure is 1,000 lbs. divided by 28.26 sq in =35.38 psi/sq-in. The accumulator bladder surface will see 35.38 psi and will require a starting pressure of at least 35.38 psi in the accumulator to balance the load with a nearly fully expanded bladder. The impact force from the 1,000 lbs load dropping six inches to a rigid surface is 1,000 lbs times the acceleration due to gravity of 32.174 ft/s. Convert to inches per sec=32.174 multiplied by 12 inches per foot=386.088 in/sec. The time to go 6 inches is SQRT (2×6/386.088 in/sec=0.176298 sec. The velocity at impact is =(2×6 in ×386.088 in/sec2) squared.=68.0665 in/sec=340.3325 ft/min. The impact force equation is Ft=0−mv=1,000 lbs×68.0665 in/sec. Impact force=−mv/t=−1,000 lb×68.0665 in/sec/0.176298 sec=386087.7604964322 in-lbs=323,2173.980 ft-lbs=32 Gs with no shock limiting. To reduce the impact force to 7 Gs, the energy must be stored for 32 Gs−7 Gs=25 Gs. A rod travel of 4.7 inches will reduce the shock impact to 7 Gs or less. An equivalent accumulator gas volume will reduce the impact to acceptable levels.

It should be further understood, and in exemplary non-limiting cases or situations, the following information is relevant to embodiments using the shock damping systems discussed throughout this document on forklifts. The forks are used to handle static loads of goods, for one non-limiting example, 1,000 lbs., but the goods may be damaged if subjected to dynamic loads that are much higher than the static loads. Dynamic shock loads can be 100 times or even greater than the static loads if the surface and the fork system is rigid. The engineering solution is a system that allows the load to move so the shock force is converted to acceleration of the load. Therefore, the maximum shock force is reduced to less than 4 to 10 times the static force. If the lower force is low enough then no damage to the load occurs. A function of the hydraulic cylinder is to allow the load to move when subjected to a dynamic shock that is 3 times the static load or greater. The sizing of the cylinder rod travel needs to be no less than 1½ times the expected travel or drop that created the shock force. A 6-inch drop would need a 9-inch travel for the cylinder rod. Maximum pressure for hydraulic systems can vary, but generally, range from a maximum pressure of 3,000 psi to 5,000 psi for systems with over pressure release. The piston size of the cylinder is determined by the operating pressure of the system and the maximum load to be carried.

It should be further understood, and in exemplary non-limiting cases or situations, standard high pressure hydraulic hoses of ⅜ inch is sufficient for most applications with cylinder piston sizes under 6 inches.

It should be further understood, and in exemplary non-limiting cases or situations, sizing of the accumulator is determined based on volume of hydraulic fluid and pressure of the nitrogen in the gas side of the accumulator. The volume must be large enough to contain the hydraulic fluid pushed out of the piston during the shock force applied to the cylinder. The nitrogen pressure is set at the pressure which just supports the expected static load. This pressure is determined based on the piston area of the cylinders and the hydraulic advantage of the system. The check valve in the system allows rapid flow of the hydraulic fluid out of the cylinder to keep the dynamic force low. The check set pressure is set at 10 to 20 psi to assure a good set force when closed. The needle valve in the system provides an adjustable orifice size that allows the fluid back into the cylinder. The smaller the orifice the longer the time it takes to equalize the pressure between the accumulator and the cylinder. A ½ threaded fitting throttle valve is sufficient for the system handling 200 lbs to 5,000 lbs loads.

It should be further understood, and in exemplary non-limiting cases or situations, the invention provides dampening from friction of the hydraulic fluid flowing through the hoses and orifices in the valves. The control system will dampen the bounce of the load very quickly in most cases the bounce is totally dissipated in 3 bounces. This damping prevents an accumulation of shock forces increasing due to washboard surfaces that may be encountered by a vehicle such as a tractor with a forklift.

It should be further understood, and in exemplary non-limiting cases or situations, a ½ in High Pressure 5,000 psi nettle valve will provide orifice sizes that will provide for flows from 0 GPM (gallons per minute) to 40 GPM.

It should be further understood, and in exemplary non-limiting cases or situations, the invention provides for a more stable load and the tractor of fork can operate at higher speeds and not bounce the load off the forks. This greatly reduces the chance of losing, or damaging, a load while going over bumps or making corners. The productivity of the tractor is increased with no impact to the product quality.

It should be further understood, and in exemplary non-limiting cases or situations, the shock damping systems disclosed throughout this document may be scaled up or down to handle very light and sensitive loads, or respectively, very large and heavy loads that can be easily damaged by shock impacts. Examples are heavy equipment movers, large hydraulic crane systems. The shock damping systems disclosed herein are not only for vertical loads but can be applied to loads in the horizontal, or at any angle, to reduce impact shock loads. That is, the shock damping systems disclosed herein can dampen the magnitude of force having a vector anywhere in three-dimensional space. An exemplary non-limiting situation of reducing a horizontal shock load would be applying a shock impact limiter to the coupling between cars on a railroad train.

It should be further understood, and in exemplary non-limiting cases or situations, the shock dampening systems disclosed throughout this document may also have military uses to absorb the energy from bullets and IUD explosions. The shock dampening systems would be configure to allow armor plates to move and dissipate energy. This can greatly reduce the shock wave and redirect the vector of the shock wave away from personnel.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect.

What is claimed is:

1. A shock damping system comprising:
a pressure storage reservoir;
a check valve in fluid communication with the pressure storage reservoir;
a needle valve in fluid communication with the pressure storage reservoir; and
a fluid source in direct fluid communication with the needle valve; and
wherein:
the check valve comprises a first and second passageway; and
the needle valve comprises a first and second passageway, both first passageways directly coupled to each other and both second passageways directly coupled to each other.

2. The shock damping system of claim 1 wherein:
the needle valve is in a parallel fluid-communication configuration with the check valve.

3. The shock damping system of claim 1 wherein the pressure storage reservoir comprises a gas orifice and a liquid orifice, and wherein at least one of the check valve and the needle valve is in fluid communication with the liquid orifice of the pressure storage reservoir.

4. The shock damping system of claim 1 wherein the pressure storage reservoir comprises a gas orifice and a liquid orifice, and wherein both of the check valve and the needle valve are in fluid communication with the liquid orifice of the pressure storage reservoir.

5. The shock damping system of claim 1 wherein the pressure storage reservoir comprises a hydraulic accumulator.

6. The shock damping system of claim 1 wherein the pressure storage reservoir comprises a compressed gas accumulator.

7. The shock damping system of claim 6 wherein the compressed gas accumulator comprises a bladder.

8. The shock damping system of claim 1 wherein the needle valve is adjustable.

9. The shock damping system of claim 1 wherein the needle valve comprises the capability for adjustment of an orifice, the adjustment capability configured to allow a fluid flow ranging from 0 gallons per minute to 40 gallons per minute.

10. The shock damping system of claim 1 further comprising an isolation valve in direct fluid communication with at least one of the needle valve and the check valve.

11. The shock damping system of claim 10 further comprising a pressure gauge in direct fluid communication with the isolation valve.

12. The shock damping system of claim 1 wherein both of the first passageways are directly coupled to the pressure storage reservoir.

13. The shock damping system of claim 12 wherein both of the second passageways are directly coupled to the fluid source.

14. A shock damping system comprising:
first and second pressure storage reservoirs;
first and second check valves in fluid communication with the respective first and second pressure storage reservoirs, the first check valve directly coupled to the first pressure storage reservoir; and
first and second needle valves in fluid communication with respective first and second pressure storage reservoirs, the first needle valve directly coupled to the first pressure storage reservoir.

15. The shock damping system of claim 14 wherein the first needle valve is in a parallel fluid-communication configuration with the first check valve.

16. The shock damping system of claim 15 wherein the second needle valve is in a parallel fluid-communication configuration with the second check valve.

* * * * *

UNITED STATES PATENT AND TRADEMARK OFFICE
CERTIFICATE OF CORRECTION

| | | |
|---|---|---|
| PATENT NO. | : 11,143,261 B2 | |
| APPLICATION NO. | : 15/976797 | |
| DATED | : October 12, 2021 | |
| INVENTOR(S) | : Francis Wilson Moore | |

It is certified that error appears in the above-identified patent and that said Letters Patent is hereby corrected as shown below:

On the Title Page

(56) References Cited, 2nd Column, Line 18:
Replace "WO WO 4/2011" with --WO PCT/US2010/046678 Srch Rpt 4/2011--

2nd Column, Line 19:
Replace "PCT/US2010/046678" with --WO PCT/US2010/046678 Wtn Opn 4/2011--

In the Drawings

FIG. 7, 2nd figure:
Add the number "800"

In the Specification

Column 2, Line 49:
Replace "system." with --systems.--

Column 2, Line 66:
Replace "cause cruse" with --cause--

Column 5, Line 63:
Replace "cannister" with --canister--

Column 10, Line 8:
Replace "time" with --times--

Signed and Sealed this
Tenth Day of May, 2022

Katherine Kelly Vidal
*Director of the United States Patent and Trademark Office*